United States Patent [19]

Moore et al.

[11] 4,262,703

[45] Apr. 21, 1981

[54] IMPACT RESISTANT CONTROL LINE

[75] Inventors: Boyd B. Moore; Clarence E. Kendall, Jr., both of Houston, Tex.

[73] Assignee: Custom Cable Company, Houston, Tex.

[21] Appl. No.: 932,084

[22] Filed: Aug. 8, 1978

[51] Int. Cl.³ .............................................. F16L 11/08
[52] U.S. Cl. ................................... 138/115; 138/111; 174/47; 174/117 F
[58] Field of Search ............... 138/112, 115, 174, 117, 138/111; 166/242, 72; 350/96.23

[56] References Cited

U.S. PATENT DOCUMENTS

| | | | |
|---|---|---|---|
| 2,722,237 | 11/1955 | Rosel | 138/174 |
| 3,477,474 | 11/1969 | Mesler | 138/174 |
| 3,526,086 | 9/1970 | Morgan | 138/111 |
| 3,844,345 | 10/1974 | Evans et al. | 166/72 |
| 4,089,585 | 5/1978 | Slaughter et al. | 350/96.23 |

Primary Examiner—Lenard A. Footland
Attorney, Agent, or Firm—Jennings B. Thompson; Marvin B. Eickenroht

[57] ABSTRACT

An impact- and tension-resistant control line suitable for attachment to an underwater oil or gas flow line, for attachment to a downhole tubing string or for control in subsea workover operations. The control line protector includes a resilient elongated body, any number of hydraulic tubes, electrical and electronic lines within the body and at least two impact-resistant, tensional-bearing members such as wire ropes within the body. When viewed in cross-section, the wire ropes are disposed within the body so that the protected control lines lie between the two wire ropes and a planar force or impact from any direction cannot directly contact the protected control lines. Additional impact-resistant, load-bearing members can be disposed among the protected control lines to insure that a planar force cannot directly contact the protected control lines while the device is attached to a flow line.

1 Claim, 6 Drawing Figures

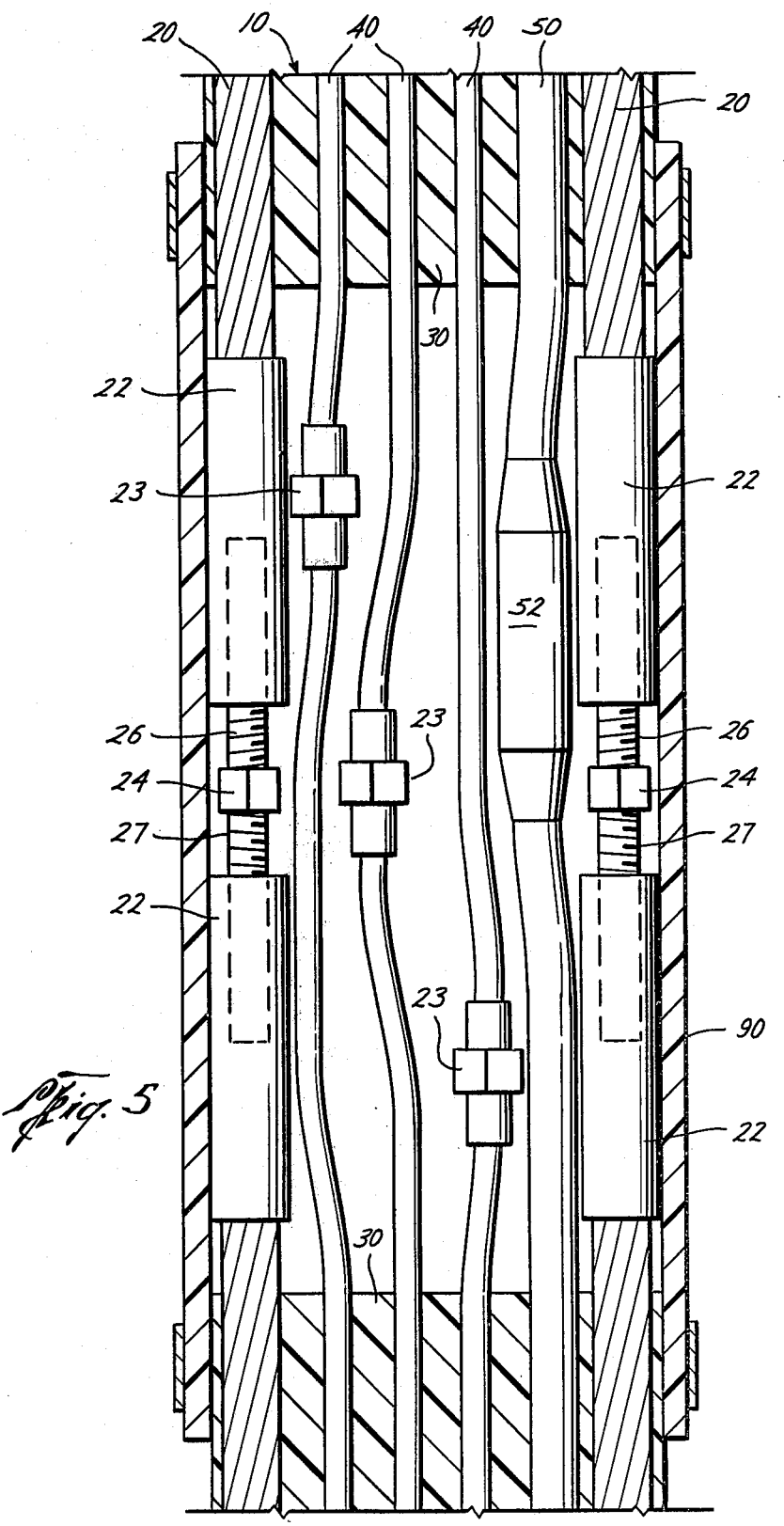

IMPACT RESISTANT CONTROL LINE

BACKGROUND OF THE INVENTION

Field of the Invention

This invention relates to the field of devices for protecting various types of control lines, such as hydraulic, electrical, and electronic control lines. Control lines are used, for example, in subsurface drilling operations and in the production activities of offshore oil and gas wells. In offshore operations, these lines extend from a control console located on the platform to valves, blowout preventers and other related devices located at or near a number of wellheads located around the platform.

The control lines are generally, but not always, strapped at intervals to the flow lines through which the oil and gas flows. Individual or multiple control lines are sheathed in a plastic-like material and the sheathed control line is attached to the flow line. In one form of the prior art, a single steel wire cable is encapsulated between two or more control lines, the wire cable having a diameter no greater than the control lines.

In offshore production areas, the flow lines and accompanying control lines leading from the well head to the platform are frequently subjected to impacts and forces caused by surface craft, floating debris and objects which sink to the ocean floor and contact the control lines. Consequently, the control lines are subject to impulse or impact and damaging forces applied thereto. The objects which create the impact or forces on the control lines are generally of such magnitude that the impact upon the control line can be represented by an impact plane acting upon the control lines. The impact line or force line therefore comes directly in contact with the enclosed hydraulic, electrical or electronic control lines subjecting these lines to damage. A continuous force such as an underwater rock and the like can constrict the reinforced plastic-like hydraulic lines thereby reducing their effectiveness in transmitting hydraulic fluid and forces which are transmitted from the platform to the well head in order to activate one or more values. Electrical and electronic control lines, when subjected to sharp impact or large forces are frequently severed and rendered inoperative.

Further shortcomings of existing control lines results from the splicing of the control lines. Whenever a break occurs in a flow line or in a control line, a splice is necessary. Most existing control lines consist of any number of hydraulic, electrical or electronic control lines cabled in relation to each other and encapsulated within a plastic-like jacket. If the distance between the platform and the well head is greater than the capacity of the control line bundle on the reel, it is necessary to splice additional control line length onto the original control line. Furthermore, if the control line is damaged, it is necessary to cut and splice the line around the damaged area. Because of the cabled configuration of most control lines, it is both difficult and time consuming to align the various encapsulated hydraulic, electrical and electronic lines and to splice the severed lines without a bulky support. In many cases, after the splice is accomplished, the control line is either equal in length to or effectively shorter than the other lines used with it. Consequently, any tension in the flow-line-control-line combination is somewhat borne by the control lines themselves.

Control line bundles generally consist of a first bundle containing hydraulic tubing and one or more additional bundles containing the desired electrical or electronic lines. Because hydraulic lines within the bundle are usually reinforced plastic-like lines, they are of a substantial cross-sectional area in order to obtain sufficient strength to contain the hydraulic pressure within. Moreover, because of their cabled configuration, the cross-sectional area of the hydraulic control line bundle is significant thereby reducing the length of the bundle placed on each reel. Thus, a number of reels and accompanying splices are required in order to complete the line from the platform to the underwater wellhead. The resulting weight, bulk, inconvenience in shipping and vast effort required in wrapping the control line bundle to the flow line and laying the combination under water is undesirable.

The most pertinent prior art of which the applicant is aware is an encapsulated control line described in U.S. Pat. No. 3,844,345 issued Oct. 29, 1974 to Evans. The device in the U.S. Pat. No. 3,844,345 is a substantial improvement over the above-described prior art in that the plurality of control tubes within the elastomeric material provides a reduction in the cross-sectional area of the encapsulated control line, and, when strapped to the flow line, generally conforms to the exterior cylindrical surface of the flow line. The applicant is further aware of a modification of the '345 device wherein a wire rope is embedded within the elastomeric material between the control lines. The modification to the '345 device, however, permits damage from impact and external forces on the encapsulated control tubes. In accordance with 37 C.F.R. 1.98(b), a copy of the foregoing patent is appended hereto.

SUMMARY OF THE INVENTION

The novel device of the present invention encapsulates a plurality of control lines substantially aligned and parallel to one another within a resilient material which, when strapped to a flow line, tends to conform to the exterior surface of said flow line. The control lines are disposed in relation to at least two impact-resistant, tensional load-bearing wire ropes of greater diameter than the control lines so that the control lines or tubes are protected from direct contact by external forces and impact. The present invention weighs approximately one-half the linear weight per foot of most cabled and encapsulated control lines. Accordingly, approximately twenty-six thousand feet of the impact-resistant control line can be wound around a single reel in comparison with a like requirement of fourteen reels of cabled bundles.

The present invention preferably further utilizes one-quarter inch O.D. metal tubes having a 0.180 inch I.D. The metal tubes are conventional, and are not unknown to the '345 patent disclosure. For distances of twenty thousand feet, however, reinforced 0.250 inch I.D. plastic-like tubes have a one minute, forty second delay between the hydraulic signal from the platform to the actual actuation of the hydraulic valve located at or near the wellhead. The time required using 0.180 inch I.D. metal tubing for a corresponding distance is twenty seconds, or approximately one-fifth the response time of the plastic-like tubes. The present invention further utilizes a plurality, two or more, wire ropes enclosed within the resilient matrix. When the two wire ropes are used, they are larger in diameter than the control lines to be protected and the control lines are disposed substantially between the larger wire ropes so that the plane of impact or external force cannot directly contact the protected control lines. If a large number of protected control lines are required, one or more additional larger diameter wire ropes can be interspersed at intervals within the resilient matrix to insure that the plane of impact or external force cannot directly contact the protected control lines.

It is, therefore, an object of the present invention to provide a device for protecting a plurality of control lines through the provision of a protective resilient sheath or matrix and impact-resistant members, such that the sheath covers both impact-resistant members and the control lines to be protected.

A further object of the present invention is the provision of such a device in which the impact-resistant members are situated so that the effect of a force generated by an impact to the device is absorbed primarily by the impact-resistant members.

A still further object of the present invention is the provision of such a device in which the protective sheath is formed of a suitable material, such as an elastomeric material, which tends to disperse impact forces thereby reducing the effect of such forces on the control lines to be protected.

Yet another object of the present invention is an impact-resistant control line wherein the impact-resistant members are also load-bearing, which impact-resistant control line can be connected one segment to another so that the protected control lines and the impact- and tension-resistant members are disposed generally in parallel to one another such that the length of the protected control lines at the point of connection is longer than the length of the impact- and tension-resistant members thereby tending to relieve the protected control lines from tensional forces.

An even further object of the present invention is an impact-resistant and tension-resistant control line having parallel construction of the protected control lines and the impact-resistant, tension-bearing members thereby providing quick and easy repair and connecting of the device as necessary.

Another object of the present invention is to provide an impact-resistant, tension-bearing control line protector which, when strapped to a flow line at intervals, will generally conform to the exterior of the flow line thereby reducing the overall cross section of the combined control lines and flow line thereby making the combination easier to handle and less susceptible to cross-ocean currents during laying operations.

Another object of the present invention is to provide an impact- and tension-resistant control line which, when strapped at intervals to the production tubing in an oil or gas well, will prevent the protected control lines from impact and abrasion by the well casing during the installation or removal of the production tubing and control lines in the bore of the casing, particularly when the casing is curved as in the case of a diverted well.

These and other objects of the present invention will become readily apparent when read in light of the subsequent specification, drawings and claims appended hereto.

BRIEF DESCRIPTION OF THE DRAWINGS

FIG. 5 is an exposed side elevation view of another embodiment of the present invention disclosing the configuration of the invention following a connection.

DESCRIPTION OF THE PREFERRED EMBODIMENTS

Figure 1:
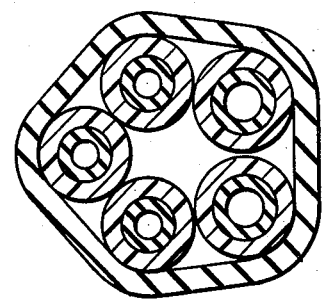
FIG. 1 is a cross-sectional view of a conventional bundle of control tubes.
Figure 2:
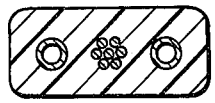
FIG. 2 is a cross-sectional view of an existing encapsulated control line.
Figure 3:
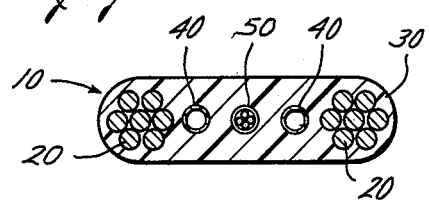
FIG. 3 is a cross-sectional view of one embodiment of the present invention.
Figure 4:
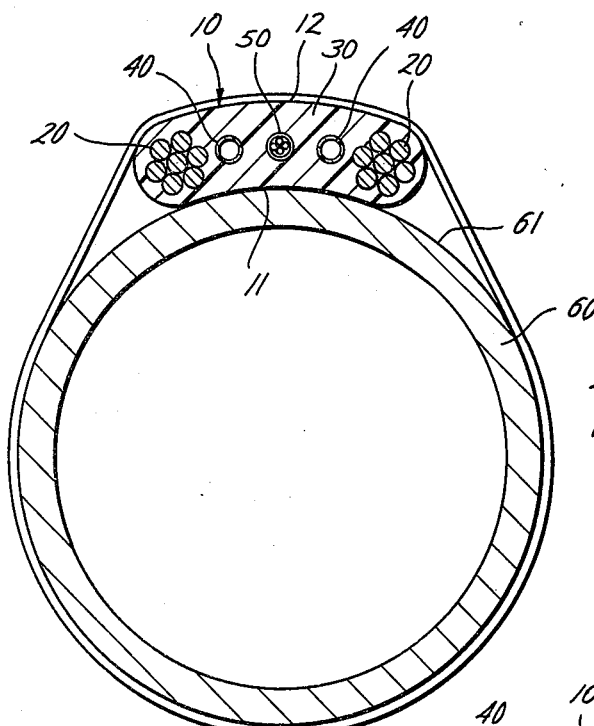
FIG. 4 is a cross-sectional view of an alternative embodiment of the present invention in place on a flow line.

The embodiments of the present invention relate to a device for protecting control lines. Referring now to FIGS. 3 and 4 of the drawings, the protector device according to the present invention is generally designated by the reference numeral 10. The protector device 10 includes a resilient matrix or body member 30, two or more load-bearing, impact-resistant members 20, and a plurality of control tubes 40 and electrical line 50. The impact-resistant members 20 are positioned within the body member 30 in relation to the control tubes 40 and electrical line 50 so that the impact-resistant members 20 will resist the major part of any impact force. The impact-resistant members 20 further bear tensional forces. In FIG. 4, the protector device 10 tends to conform to the shape of the outer surface of the rigid flow line 60 when the device is attached to it. In FIG. 4, the control tubes 40 and electrical line 50 are positioned within the resilient matrix 30 so that they are not directly contacted by a force or impact plane on the body member 30. An impact plane or force plane is any impact or force exerted over an area sufficiently great enough that the force or impact is received by the impact-resistant members 20 and not by the protected control lines. Thus, the tubes 40 and electrical line 50 are similarly protected during deviated downhole operations in which the control line is attached to a production tubing which is either installed or removed within a curved portion of the well casing. The members 20 protect the tubes 40 and line 50 against abrasion and crushing forces resulting from the contact by the tubing against the curved portion of the casing.

Figure 6:
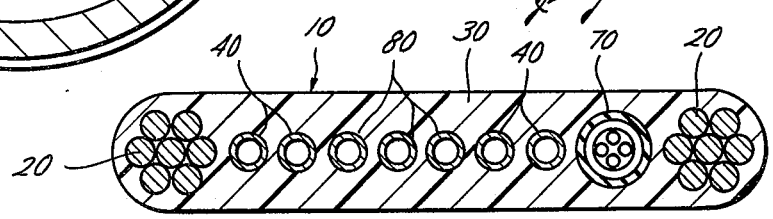
FIG. 6 is a cross-sectional view of a still further embodiment of the present invention depicting a plurality of wire rope members and a plurality of control tubes.

In FIG. 6 another embodiment of the protector device 10 is depicted. The protector device 10 in FIG. 6 includes a plurality of control tubes 40 and 80 and an electrical line 70. It is understood that additional impact-resistant members 20 can be disposed within the body 30 to protect the lines 40, 70 and 80 from impact.

FIG. 5 depicts the configuration of the protector device 10 after a connection has been made. Following the connection, the lengths of the control tubes 40 and electrical line 50 are longer than the lengths of the impact-resistant members 20 so that the members 20 bear substantially all the tensional forces on the device as a whole. The adjustment of the lengths of the impact-resistant members 20 is easily accomplished by utilizing the conventional adjustable swage fittings 22. The impact-resistant, load-bearing members 20 are preferably 19-strand wire ropes, connected by conventional and adjustable swage fittings 22 which are adjusted along the threads 26 and 27 toward the nut 24. As depicted in FIG. 5, the control tubes 40 are preferably connected by standard tube couplings 42; similarly, the electrical line 50 is connected at location 52. A sheath 90 preferably encompasses the connected segment of the body 30.

Following a connection as indicated in FIG. 5, the tensional load will be borne by the wire ropes 20 since the control tubes 40 and 50 are effectively longer than the wire ropes 20.

The body member 30 is formed of any suitable elastomeric material such as polyethylene, polyurethane, polyvinylchloride or any other similar material which tends to retain the relative position of the wire ropes 20, tubes 40 and line 50. To some degree, the elastomeric body member or matrix 30 also reduces the effect of impact forces on the protected elements.

According to the preferred embodiment, a plurality of metal tubes 40 are disposed within a resilient matrix 30. The metal tubes 40 are preferably quarter-inch outside diameter metal tubing suitable for the transmission of hydraulic forces therein. It is understood that the diameter of the metal tubes 40 can vary in relation to the minimum cross-sectional area required to actuate a valve or charge a hydraulic accumulator and the desirability of minimizing the overall cross-sectional area of the device 10. Any number of electronic or electrical lines 50 may also be disposed within the resilient body 30. At least two impact-resistant, tensional-bearing members 20 are likewise disposed within the resilient, elastomeric matrix 30. Preferably, the impact-resistant, tensional-bearing members 20 are 19-strand wire ropes. The wire ropes 20, tubes 40 and electrical line 50 are substantially parallel to permit a ribbon-like shape of the device 10, to facilitate the connecting of the segments of the device 10 and to allow quick and easy adjustment of the lengths of wire rope 20, tubes 40 and electrical line 50. Accordingly, the wire ropes 20 can be adjusted in combination with one another so that each bears a share of the tensional forces and to insure that neither the tubes 40 nor the electrical line 50 is required to support any significant tensional load.

When the impact-resistant device 10 is strapped at intervals to a flow line 60 as shown in FIG. 4, the device 10 tends to conform to the exterior surface 61 of the flow line 60 thereby reducing the overall cross-section of the combination. Accordingly, the handling and laying procedures of the flow line 60, wire ropes 20, tubes 40 and electrical lines 50 are facilitated while at the same time the effect of cross-ocean currents during laying operations is reduced. Because of the high specific gravity of the wire rope and metal tubes, and because there are substantially no unfilled interstices within the body or matrix 30, the specific gravity of the device 10 is sufficient to insure that it rests on the ocean floor and does not float, thereby eliminating the necessity of attaching weighting material to the control line bundle. When the improved device 10 is strapped at intervals to the flow line 60, any planar force comes into contact with a pair of points consisting of one wire rope 20 and the flow line 60 or the pair of wire ropes 20. Most importantly, however, the planar impact does not directly contact the tubes 40 or electrical line 50 as shown in FIG. 4.

When viewed in cross-section as in FIGS. 3 and 6, the impact- and tension-resistant control line is symmetrical along a transverse axis bisecting the wire ropes. This symmetry permits the device to be wound upon a reel in a ribbon-like manner so that it is always in the proper relation to the flow line as the combination of the two is laid at sea.

The present invention, therefore, is well adapted to carry out the objects and attain the ends and advantages mentioned as well as those inherent therein. While presently preferred embodiments of the invention have been given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. An impact-resistant multiple control line cable for attaching along the side of an underwater flow line comprising a flat-sided body of resilient elastomeric material that is substantially wider than it is thick to allow the body to be bent around its longitudinal axis to conform to the curvature of the flow line to which it is attached, a plurality of control lines embedded in the body and extending parallel to the longitudinal axis thereof, said control lines being spaced apart along a line transverse the longitudinal axis of the body and equidistant from the flat sides of the body, and a plurality of tensile members, for carrying any tensile load imposed on the control line, positioned with their longitudinal axes on the same transverse line along which the control lines are spaced to be equidistant between the flat sides of the body, said tensile lines having a diameter substantially greater than the control lines and spaced so that a line tangent to the outer surface of two adjacent tensile lines will extend above the control lines between them on the opposite side from the flow line to which the cable is attached to provide protection to the control lines.

* * * * *